No. 618,277. Patented Jan. 24, 1899.
J. LANG & R. BERGER.
WAR GAME.
(Application filed Sept. 3, 1898.)
(No Model.)
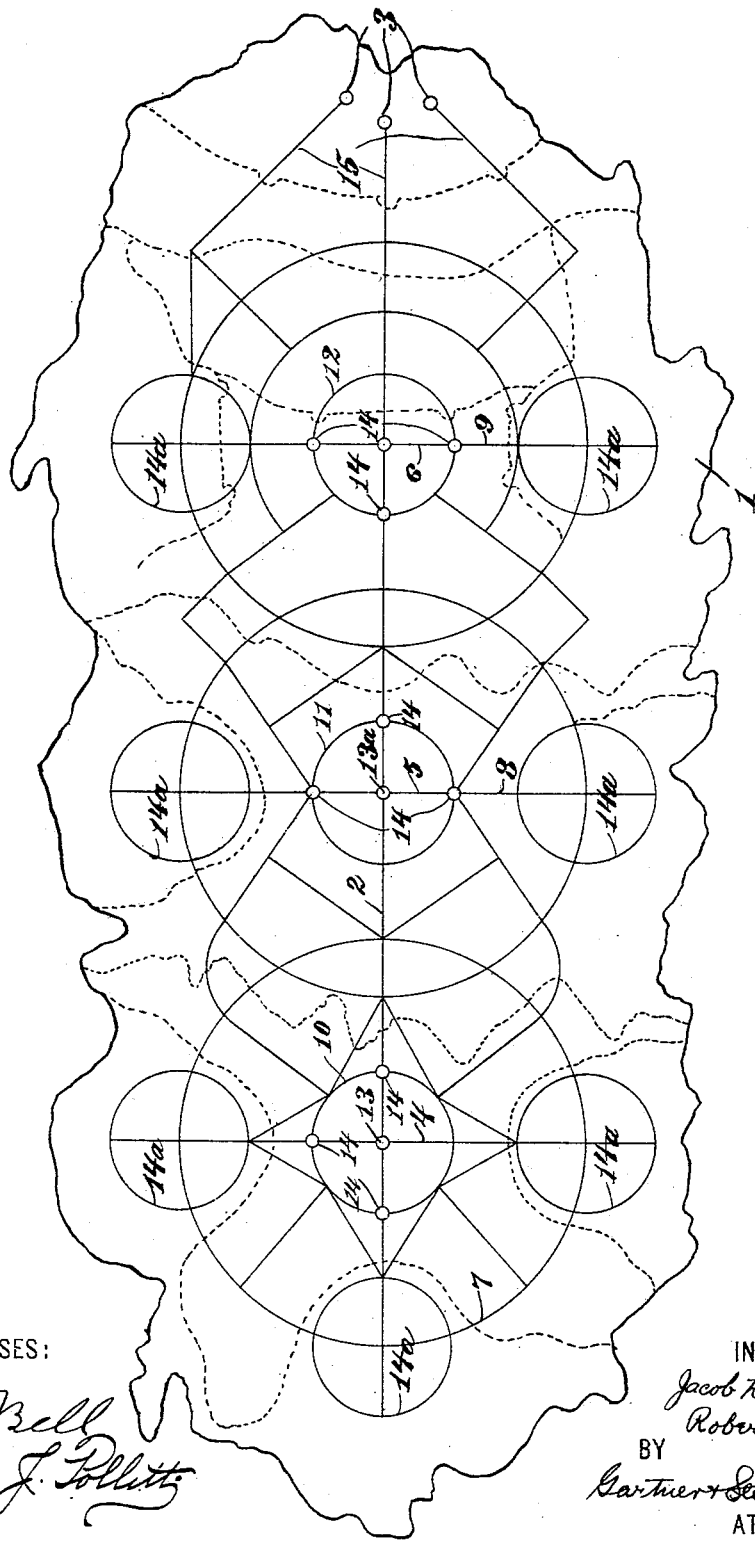
WITNESSES:
INVENTORS
Jacob Lang
Robert Berger
BY
Gartner & Steward
ATTORNEYS

UNITED STATES PATENT OFFICE.

JACOB LANG AND ROBERT BERGER, OF PATERSON, NEW JERSEY.

WAR GAME.

SPECIFICATION forming part of Letters Patent No. 618,277, dated January 24, 1899.

Application filed September 3, 1898. Serial No. 690,171. (No model.)

*To all whom it may concern:*

Be it known that we, JACOB LANG and ROBERT BERGER, citizens of the United States, residing at Paterson, county of Passaic, and State of New Jersey, have invented certain new and useful Improvements in War Games; and we do hereby declare the following to be a full, clear, and exact description of the invention, such as will enable others skilled in the art to which it appertains to make and use the same, reference being had to the accompanying drawing, and to figures of reference marked thereon, which forms a part of this specification.

Our invention relates to game apparatus; and the invention consists in the peculiar combination and arrangement of a series of lines upon a suitable board or other background, over which lines one side endeavors to move a "man" from one end toward a goal at the other end of the board in opposition to the other side, whose object is to so manipulate his "men" as to prevent the goal being reached by his opponent.

As a means for rendering the apparatus an attractive marketable one, as well as entertaining and interesting, it may be prepared and designed to represent some national or other pending contest. For the purpose of the following description we have selected a map supposed to represent the island of Cuba, upon which men are arranged as standing on the one side for the American forces and on the other side for the Spanish forces.

The plan of the game-board is clearly shown in the accompanying drawing, in which there is a diagram comprising the lines above referred to and shown as laid out upon a map of the island of Cuba. Said diagram may be described as follows:

Extending centrally and longitudinally of the map 1 is a line 2, terminating at one end in the central one of the three goals 3 and intersected at right angles by substantially equidistantly-situated parallel lines 4, 5, and 6, the intersections of the parallel lines and of the line 2 constituting centers for circles 7, 8, and 9, respectively, of which the middle circle 8 slightly overlaps the other two. Within each of these circles is concentrically arranged a smaller circle 10, 11, and 12, respectively.

At the intersections of the transverse lines with the longitudinal lines are, in the circles 7 and 8, respectively, a starting-point 13 and a secondary starting-point 13$^a$, and at each of three of the intersections of each smaller circle with said longitudinal and transverse lines is a post or station 14. These points may be shown in any desired manner on the diagram.

About each intersection of each transverse line with a corresponding outer or larger circle is described a small circle 14$^a$ about the size of the circles 10, 11, and 12. One of these circles 14$^a$ is also similarly arranged at the intersection of the longitudinal line with the larger circle 7. A series of lines arbitrarily arranged (the arrangement of the lines which we have shown in the diagram is very desirable) connects the circles which are concentrically arranged, the smaller circles, and the larger circles, finally terminating in lead-lines 15, each of which connects with one of the outer goals 3.

The spaces inclosed by the circles 7, 8, and 9 we term "fields," and those inclosed by the smaller circles 14$^a$ we call "blockading-points" or "inclosures."

The men used may be checkers or other suitable objects. One man represents the American force and nine men the Spanish forces, and they are initially disposed with the American man on the starting-point and the Spanish men in three sets, one set in each large circle and a man at each post or station 14 at the intersection of the transverse and longitudinal lines with the smaller circles. The American man is to be manipulated with the object of finally leading him from the diagram at one of the goals 3, and the Spanish men are to be moved with the intention of preventing the escape of said American man at any of said goals. The American and Spanish men may both be moved in any direction along the lines, the sides alternately moving a man only as far as the next intersection. The American man may be moved throughout the whole diagram; but the sets of Spanish men are confined to their respective large circles or fields, and in this connection it should be remarked that when a move is made that leaves the American at the intersection of two large circles he is to be considered as being within the field just reached, so that the next move made by the other side should come from a man of that set in this field. The Spanish men are moved to prevent the American from passing toward the goal and so as, if possible, to confine or blockade him against further moves in one of the blockading-points or inclosures; or they are moved so as to surround him in one of the two fields nearer the goal, which may be accomplished if, for instance, the men of that set of Spaniards last passed happen to have been so disposed when their circle or field was left by the American that it is possible for the Spaniards in the set being played to be moved relatively thereto, so that escape over any line is impossible. If the American is blockaded, the game is lost to him. If he is surrounded, all the men are rearranged, the American starting, however, from the center of that circle or field which he left before being surrounded, and the game proceeds as usual.

If desired, it is obvious that the map may be illustrated to represent thereon fortifications, cities, towns, military camps, &c., and these various places may be appropriately designated. These various points or places we have shown in the dotted lines of the drawing.

Having thus fully described our invention, what we claim, and desire to secure by Letters Patent, is—

1. In a game apparatus, the combination of a series of fields, a system of routes delineated on said series of fields and connecting the latter and each other, and men, some of said men being adapted for moving consecutively through the series of fields by way of said routes toward the goal or goals and other of said men being movable by way of said routes in opposition to the first-named ones and arranged in sets each confined to a corresponding field, substantially as described.

2. In a game apparatus, the combination of a series of fields, a system of routes delineated on said series of fields and connecting the latter and each other, men, some of said men being adapted for moving consecutively through the series of fields by way of said routes toward the goal or goals and other of said men being movable by way of said routes in opposition to the first-named ones and arranged in sets each confined to a corresponding field, and blockading-points constituting the extremities of some of said routes, substantially as described.

In testimony that we claim the foregoing we have hereunto set our hands this 22d day of August, 1898.

JACOB LANG.
ROBERT BERGER.

Witnesses:
JOHN W. STEWARD,
WM. D. BELL.